No. 698,172. Patented Apr. 22, 1902.
C. BORNMANN.
PHOTOGRAPHIC SHUTTER.
(Application filed Apr. 9, 1901.)

(No Model.)

UNITED STATES PATENT OFFICE.

CARL BORNMANN, OF NEW HAVEN, CONNECTICUT, ASSIGNOR TO E. & H. T. ANTHONY & CO., OF NEW YORK, N. Y., A CORPORATION OF NEW YORK.

PHOTOGRAPHIC SHUTTER.

SPECIFICATION forming part of Letters Patent No. 698,172, dated April 22, 1902.

Application filed April 9, 1901. Serial No. 55,004. (No model.)

*To all whom it may concern:*

Be it known that I, CARL BORNMANN, of New Haven, in the county of New Haven and State of Connecticut, have invented a new Improvement in Photographic Shutters, (Case A;) and I do hereby declare the following, when taken in connection with the accompanying drawings and the figures of reference marked thereon, to be a full, clear, and exact description of the same, and which said drawings constitute part of this specification, and represent, in—

Figure 1:
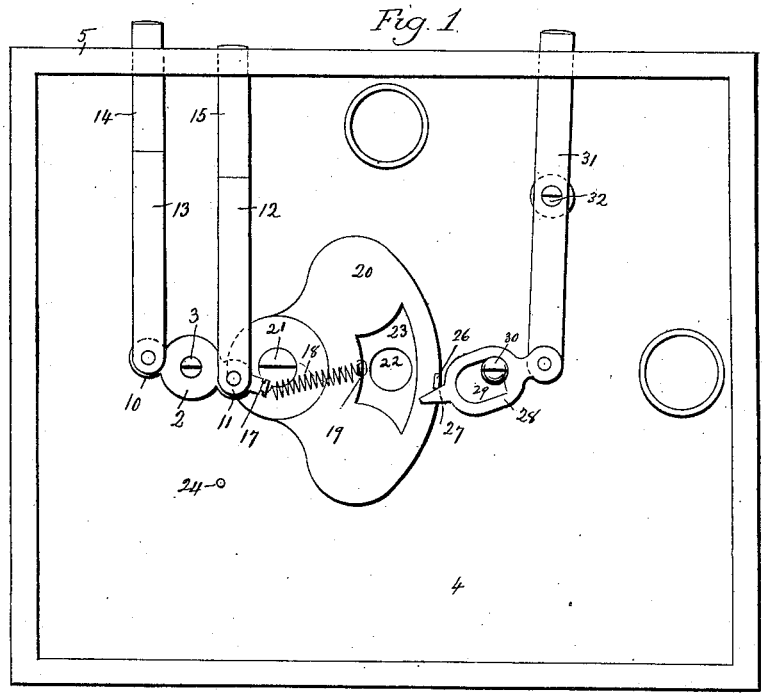
Figure 2:
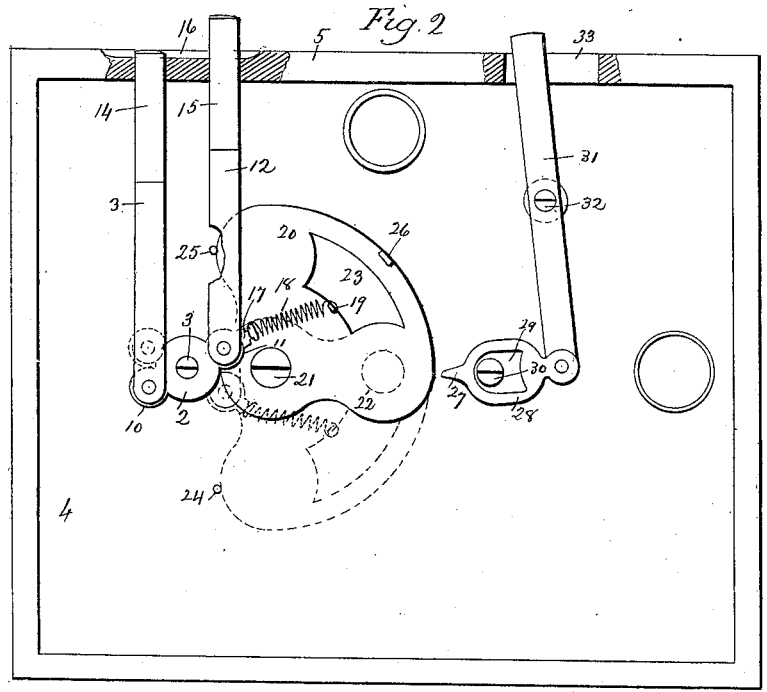

Figure 1, a view in front elevation of a camera provided with my improved shutter mechanism, the front of the camera being removed to expose the shutter-board and the mechanism being shown as adjusted for instantaneous exposures; Fig. 2, a corresponding view showing the shutter mechanism adjusted as for time exposures.

My invention relates to an improvement in photographic shutters, the object being to simplify their construction and increase the convenience and reliability of their operation.

With these ends in view my invention consists in certain details of construction and combinations of parts, as will be hereinafter described, and pointed out in the claims.

In carrying out my invention as herein shown I employ a shutter-switch 2, pivotally secured by a screw stud or pivot 3 to the front face of the shutter-board 4, which is located in the usual manner just within the front end of the camera-box 5, which also receives the front piece 6, containing the lens-opening 7 and the finder-openings 8 and 9. The said shutter-switch is formed at its ends with perforated ears 10 and 11 for the attachment to it of the long inwardly-projecting stems 12 and 13 of the push-buttons 14 and 15, which extend through and beyond the recess 16, formed in the camera-box 5. These buttons 14 and 15 and their stems 12 and 13 might with propriety be called "plungers;" but I prefer to adhere to the usual phraseology of the art and call them "push-buttons." The shutter-switch is also formed with an arm 17, which is provided for the attachment of a shutter-spring 18, connected at its opposite end with a finger 19, located in the axial center of the shutter or shutter-leaf 20, which is pivotally secured to the shutter-board 4 by means of a screw stud or pivot 21, located in line with the screw-stud 3 of the shutter-switch 2 and also located in line with the lens-opening 22, formed in the shutter-board. The shutter-switch 2 is located adjacent to the inner edge of the shutter, and when in its intermediate or lens-exposing position its longitudinal axis is in line with a line connecting its pivot 3 with the shutter-pivot 21 and the lens-opening 22, the push-buttons connected with the ends of the shutter-switch standing at right angles to this line. The shutter itself is sector-shaped in general form and provided with a central opening 23, through which light is admitted to the film within the box. Stop-pins 24 and 25, located in the board 4, limit the swinging movement or flight of the shutter in either direction in making instantaneous exposures.

When the button 15 is pushed inward, the shutter-switch will be turned on the screw-stud 3 and the spring 18 placed under tension and its inner end shifted to the opposite side of the screw-stud 21, on which the shutter is hung, whereby its line of draft is correspondingly shifted. When this takes place, the shutter will be quickly swung downward, thus making an instantaneous exposure. The shutter will now be held in this position by the spring 18, which is always under sufficient tension for that purpose. When the button 15 is being pushed inward, as described, the button 14 is by the same act being positively pushed outward by it through the medium of the shutter-switch, the movement of one button inward always corresponding to the movement of the other button outward, so that at the end of any one operation one button will have taken the place of the other. In other words, there is at no time but one button available for operation, so that there can possibly be no mistake caused by operating the wrong button, as very frequently occurs in the use of cameras. To make another exposure, the button 14 is pushed inward, whereby the shutter-switch is turned on the screw-stud 3 in the opposite direction. Then when the inner end of the spring is shifted to the opposite side of the screw-stud 21 the shutter will be quickly swung upward again, making another instantaneous exposure and resetting the push-button 15. It will thus be seen that through the medium of the shutter-switch the push-buttons 14 and 15 automatically reset each other. It will also be observed that my improved construction enables me to operate the shutter-leaf with one spring, the tension of which not only maintains the shutter-leaf in either of its positions, but also maintains the push-buttons in their positions.

For the purpose of making time exposures I provide the shutter with a finger 26, centrally located upon its outer edge and coacting with a tongue 27, formed at the outer end of a pivotal time-exposure stop 28, having a large central opening 29, receiving a stop-screw 30, located in the shutter-board 4. The said pivotal time-exposure stop is pivotally attached to the inner end of a carrier in the form of a time-exposure lever 31, hung upon a screw 32, mounted in the shutter-board and projecting outward through a slot 33, formed in the camera-box. When the projecting outer end of the time-exposure lever is moved inward, the tongue 27 of the stop 28 is cleared from the finger 26 of the shutter 20, as shown in Fig. 2. When, however, the projecting outer end of the time-stop lever is moved outward, the pivotal stop is advanced toward the shutter, so that its tongue 27 is brought into the path of the finger 26, whereby the shutter when operated will be arrested with its opening 23 registered with the lens-opening 22. In this time-exposure movement of the shutter the same describes a shorter arc; but the arc of movement is long enough to permit the line of draft of the shutter-spring 18 to be shifted from one side to the other of a line passing through the center of the screw-stud 21, on which the shutter swings. The tongue 27 of the time-stop will be engaged with one edge or the other of the finger 26 of the shutter, according to the position of the shutter when the time-exposure stop is moved into its operative position. The stop itself is limited in the range of its pivotal movement by the stop-screw 30.

I would have it understood that I do not limit myself to the exact details of construction herein shown and described, but hold myself at liberty to make such changes as fairly fall within the spirit and scope of my invention.

Having fully described my invention, what I claim as new, and desire to secure by Letters Patent, is—

1. In a photographic shutter, the combination with a pivotal shutter-leaf, of a shutter-switch located adjacent to the inner edge thereof, a spring connecting the said leaf with the adjacent end of the switch, and push-buttons connected with the opposite ends of the switch which operates to shift the draft of the spring to opposite sides of the pivot of the leaf so as to swing the leaf in one direction or the other and set one of the push-buttons.

2. In a photographic shutter, the combination with a shutter-leaf, of a shutter-switch located adjacent to the inner edge thereof, a spring having its outer end connected with the shutter, and its inner end connected with the adjacent end of the switch, and push-buttons connected with the opposite ends of the switch and standing at right angles to a line passing through the longitudinal axis of the switch when the same is in its intermediate or lens-exposing position, through the pivot of the shutter-leaf and through the lens-opening in the shutter-board.

3. In a photographic shutter, the combination with a shutter-leaf, of means for operating the same for instantaneous exposures, a swinging time-exposure stop located adjacent to the outer edge of the said leaf, and means for carrying the said stop and moving it into the path of the said edge of the leaf for engagement therewith in making time exposures.

4. In a photographic shutter, the combination with a pivotal shutter-leaf, of means for operating the same for instantaneous exposures, a swinging time-exposure stop located adjacent to the outer edge of the said leaf, and having a central opening, means located in the said opening for limiting the swinging movement of the said stop, and means for carrying the said stop and moving it into and out of the path of the said shutter.

5. In a photographic shutter, the combination with a pivotal shutter-leaf, of means for operating the same for instantaneous exposures, a swinging time-exposure stop located adjacent to the outer edge of the said leaf, and a time-exposure lever having the said stop pivotally attached to its inner end and having its outer end projected through the camera-box, the said stop being moved into or out of the path of the outer edge of the shutter by means of the said time-exposure lever.

6. In a photographic shutter, the combination with a shutter-leaf, of means for operating the same for instantaneous exposures, a swinging time-exposure stop located adjacent to the outer edge of the shutter, and formed with a tongue coacting with the said edge of the shutter, and also formed with a central opening, means entering the said opening for limiting the movement of the stop in either direction, and a time-exposure lever to which the stop is pivotally attached, and by which the stop is brought into or out of the path of the edge of the leaf the movement of which in either direction it stops, according to the way in which its tongue is engaged with the leaf.

In testimony whereof I have signed this specification in the presence of two subscribing witnesses.

CARL BORNMANN.

Witnesses:
 FREDERIC C. EARLE,
 GEORGE D. SEYMOUR.